United States Patent [19]

Van Dyk Burckard et al.

[11] Patent Number: 4,892,289

[45] Date of Patent: Jan. 9, 1990

[54] LETDOWN VALVES

[75] Inventors: Barney Van Dyk Burckard, Orkney; Hermanus Pieterse, Vaal Reefs, both of South Africa

[73] Assignee: Crucible Societe Anonyme, Luxembourg, Luxembourg

[21] Appl. No.: 452,055

[22] Filed: Dec. 22, 1982

[30] Foreign Application Priority Data

Dec. 23, 1981 [ZA] South Africa ............ 81/8895

[51] Int. Cl.$^4$ ............ F16K 31/00; F16L 7/00
[52] U.S. Cl. .................. 251/368; 251/355; 251/361; 137/375; 137/246.22; 138/45
[58] Field of Search .......... 251/356, 361, 363, 368, 251/355; 137/246, 375, 246.22; 138/45, 46

[56] References Cited

U.S. PATENT DOCUMENTS

| | | | |
|---|---|---|---|
| Re. 21,113 | 6/1939 | Sproull | 251/355 |
| 2,173,022 | 9/1939 | Mitchell | 138/46 |
| 2,643,679 | 6/1953 | Keammerer | 251/355 |
| 3,581,728 | 6/1971 | Abraham et al. | 251/355 |
| 4,071,041 | 1/1978 | Moran, Jr. et al. | 137/246.22 |
| 4,128,109 | 12/1978 | Chervenak | 137/375 |
| 4,296,307 | 10/1981 | Hagihara | 251/356 |
| 4,337,920 | 7/1982 | Parris | 251/368 |
| 4,356,997 | 11/1982 | Beffano | 251/121 |

FOREIGN PATENT DOCUMENTS

| | | | |
|---|---|---|---|
| 547921 | 11/1956 | Belgium | 251/361 |
| 189570 | 5/1906 | Fed. Rep. of Germany . | |
| 508737 | 9/1930 | Fed. Rep. of Germany | 137/246.22 |
| 3018317 | 11/1981 | Fed. Rep. of Germany . | |

OTHER PUBLICATIONS

Driskell, Les, "Coping with High Pressure Letdown", Chemical Plants Division, Dravco Corp., 10/76.

*Primary Examiner*—A. Michael Chambers
*Attorney, Agent, or Firm*—Morgan & Finnegan

[57] ABSTRACT

A letdown valve for slurries under pressure is provided with a throttle 13 inside a housing 15 with interposed lubricant sealer and grooves 16 to accommodate any excess lubricant sealer. The throttle body 13 is held in place by a retaining ring 17 which is welded in position.

4 Claims, 1 Drawing Sheet

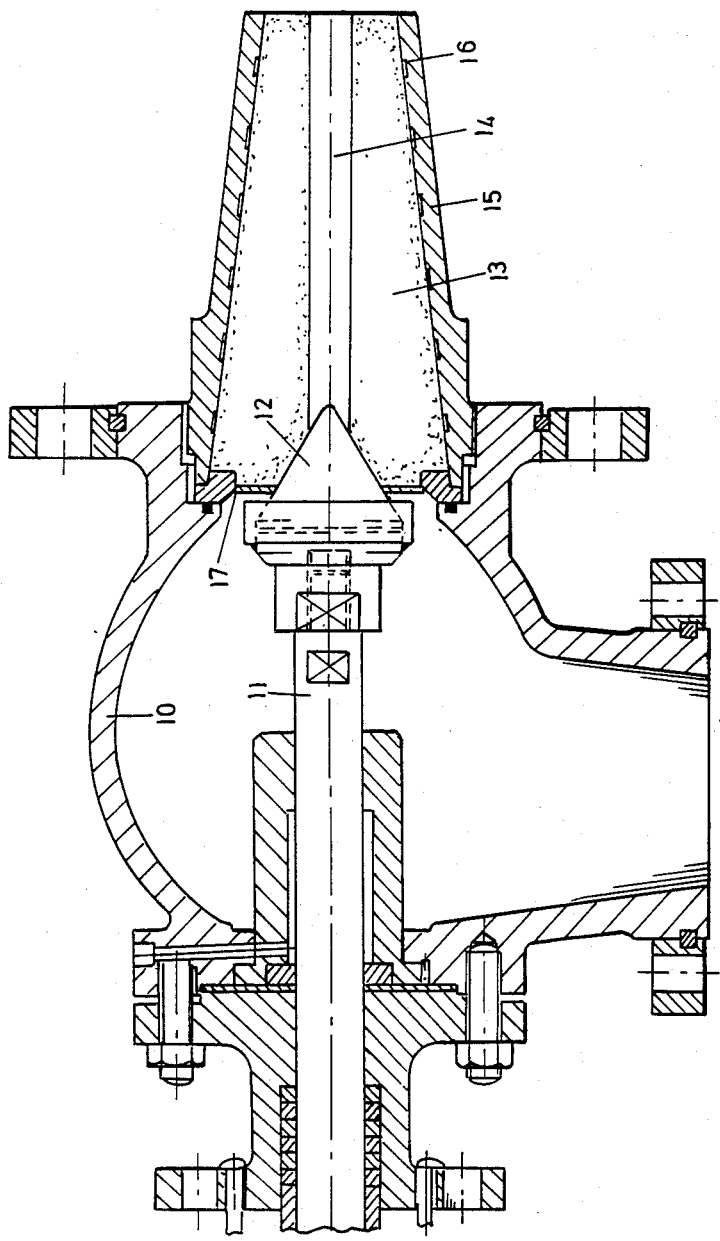

LETDOWN VALVES

BACKGROUND OF THE INVENTION

This invention relates to letdown valves which are particularly useful for the letdown of slurries which are under high pressure.

In Chemical Engineering of Oct. 25, 1976, Driskell discusses the problems associated with the high-pressure letdown. In that publication he discusses a slurry letdown valve with a throttle made of a hard ceramic material, such as alumina. In his disclosure a flanged throttling body is clamped between two rings to serve as a seat for an alumina plug and to provide the throttling passage.

Hard ceramic materials can withstand compression to a good extent, but are very weak in tension. A body as disclosed by Driskell is exposed to tensile force if the throttling passage is momentarily blocked and its unsupported end could easily snap if transverse forces were applied to it.

An object of the invention is to provide a throttle for a letdown valve which is protected against tensile forces.

SUMMARY OF THE INVENTION

The present invention provides a letdown valve of the kind comprising a plug of hard ceramic material adapted to seat on an opening formed in a throttle also composed of hard ceramic with the improvement that the throttle comprises an axially bore tapering body and a metallic housing which is a complementally tapered sleeve, the valve seat being provided at the thick end of the body as a frusto-conical surface.

Further according to the invention the body is fitted to the housing with a lubricant sealer and the housing is formed with a series of internal grooves to accomodate excess lubricant sealer. To prevent the body from popping out of its housing a retaining ring is welded in at the top after a compressive force has been applied.

In the preferred form of the invention the hard ceramic material is a silicon carbide composition such as the compositions sold under the trade names REFRAX and DURAFAX. Due to cost considerations it is preferred to use a higher grade of material for the plug and a lower grade material for the body.

DESCRIPTION OF THE DRAWING

It is a section through a letdown valve according to the invention.

DESCRIPTION OF AN EMBODIMENT

The illustrated valve has a body 10 made of a suitable stainless steel composition. A valve spindle 11 operates through a suitable packing and is actuated either by means of an electrical or a pneumatic thrustor. At its forward end the spindle 11 carries a plug 12 made of a hard ceramic material.

The plug 12 is arranged to seat on one end of a throttle 13 also made of a hard ceramic material. The body of the throttle 13 is externally tapered and axially holed to provide a throttling passage 14. The body 13 is contained in a metallic housing 15 which may be screwed into an outlet aperture in the body 10. The housing 15 is formed with a series of annular grooves 16. The throttle assembly is assembled by lining the housing 15 with a lubricant sealer and then inserting the body 13. The grooves 16 accommodate the sealer so that the body 13 does not float out. The body 13 is held in place securely by means of a spot welded ring washer 17.

The drawing shows the valve in the closed position. As can be seen the inlet to the passage 14 is tapered complementally to the conicity of the plug 12. The extent of the tapered section is such that a substantial area of the plug 12 seats on the inlet and not just a small annular area as is the case with known valves of this type.

Both the plug 12 and the body 13 are made of a silicon carbide composition. For the sake of economics the plug 12 is made of a composition sold under the trade name DURAFRAX while the body is made of REFRAX , which is cheaper than DURAFRAX. They could, of course be made of the same material.

The housing 15 serves to protect the body 13 against all tensile forces to which it may be exposed during use and installation. It is a simple matter to replace a worn throttle or to replace an existing throttle with one having a passage 14 of a different diameter as the process conditions change.

Since the housing 15 and the body 13 project away from the body 10 and no metal parts project beyond the outlet of the body 13, there is no danger that emerging fluid which flashes will destroy metallic parts.

We claim:

1. A letdown valve comprising a plug of hard ceramic material adapted to seat on a frustoconical seat in an axially bored throttle body also composed of a hard ceramic, the throttle body being received in a metallic sleeve, with the improvement that the throttle body is tapering and the metallic sleeve is complementally tapered and in that a lubricant sealer is present between the body and the sleeve and a series of internal grooves is formed in the sleeve to accomodate excess lubricant sealer.

2. A valve as claimed in claim 1 in which a retaining ring is welded to the wide end of the housing to prevent the body from popping out of the housing.

3. A valve as claimed in either claim 1 in which the hard ceramic material is a silicon carbide composition.

4. A valve as claim 1 in which a higher grade of material is used for the plug than is used for the body.

* * * * *